United States Patent [19]

Chen et al.

[11] Patent Number: 4,543,221

[45] Date of Patent: Sep. 24, 1985

[54] METHOD FOR MAKING CELLULOSE SEMIPERMEABLE HOLLOW FIBERS

[75] Inventors: David T. Chen, Clayton; Robert D. Mahoney, San Ramon, both of Calif.

[73] Assignee: CD Medical, Inc., Miami, Fla.

[21] Appl. No.: 313,443

[22] Filed: Oct. 21, 1981

Related U.S. Application Data

[62] Division of Ser. No. 104,207, Dec. 17, 1979, abandoned.

[51] Int. Cl.$^4$ ............................................. B29D 27/00
[52] U.S. Cl. .................... 264/41; 210/500.2; 264/177 F; 264/178 F; 264/200; 264/209.5
[58] Field of Search .............. 264/41, 561, 49, 509.1, 264/177 F, 177 R, 178 R, 200, 209.5; 428/398; 210/500.2

[56] References Cited

U.S. PATENT DOCUMENTS

| | | | |
|---|---|---|---|
| 3,423,491 | 1/1969 | McLain et al. | 264/49 |
| 3,441,142 | 4/1969 | Oja | 264/41 |
| 3,494,780 | 2/1970 | Skiens | 264/41 |
| 3,532,527 | 10/1970 | Skiens | 264/41 |
| 3,546,209 | 12/1970 | Lipps | 536/58 |
| 3,745,202 | 7/1973 | Biggelman et al. | 264/41 |
| 4,276,173 | 6/1981 | Kell et al. | 264/200 X |

FOREIGN PATENT DOCUMENTS

| | | | |
|---|---|---|---|
| 50-112511 | 9/1975 | Japan | 264/561 |
| 50-112512 | 9/1975 | Japan | 264/177 F |
| 54-138616 | 10/1979 | Japan | 264/177 F |
| 56-44161 | 10/1981 | Japan | 264/561 |

*Primary Examiner*—Philip Anderson
*Attorney, Agent, or Firm*—John J. Kolano; Gary D. Street; Maynard R. Johnson

[57] ABSTRACT

Improved cellulose semipermeable hollow fibers useful in detoxifying blood during hemodialysis or hemofiltration treatments. The cellulose fibers are fine, capillary fibers that are made by melt extrusion of certain cellulose ester polyol melt spin compositions into self-supporting gelled fibers. The cellulose ester gelled fibers are subsequently chemically converted into cellulose fibers by deacetylation, in aqueous alkali solution. The product fibers exhibit improved wet intrinsic tensile strength and higher water permeability characteristics than heretofore known cellulose fibers made from cellulose ester spin compositions.

The invention includes the method of making the improved fibers and separatory cells such as hemodialyzers or hemofilters which contain the improved fibers in a gamma ray sterilized condition.

9 Claims, No Drawings

METHOD FOR MAKING CELLULOSE SEMIPERMEABLE HOLLOW FIBERS

This application is a division of application Ser. No. 104,207, filed Dec. 17, 1979 and now abandoned.

BACKGROUND OF THE INVENTION

This invention relates to cellulose semipermeable hollow fibers of the type useful in dialysis, osmosis or ultrafiltration type separatory cells, and more particularly cells useful in the detoxification of blood by hemodialysis or hemofiltration. The invention also relates to an improved method for making the new fibers.

In the past the major quantity of cellulose hollow fibers used in artificial kidneys in hemodialysis was made by melt extrusion of a cellulose ester, such as cellulose triacetate, in a continuous process such as the process of U.S. Pat. No. 3,546,209. Another portion of the cellulose hollow fibers were made by the cuprammonium regenerated cellulose process of the type disclosed in an improved form in U.S. Pat. No. 3,888,771. Whereas these basically dissimiliar processes produce cellulose fibers possessing commercially acceptable water permeability (ultrafiltration) and urea permeability (clearance) characteristics for use in artificial kidneys, the fibers nevertherless fail to possess optimum combination permeabilities. For example, cellulose fibers made by the process of U.S. Pat. No. 3,546,209 have lower water permeability than is desirable in fibers that have acceptable clearance characteristics for urea, creatinine, vitamin $B_{12}$ and other low molecular weight blood impurities.

Moreover, continous manufacture of cellulose fibers from melt extruded cellulose acetate fibers involves chemical conversion from the thermoplastic polymer cellulose acetate to the non-thermoplastic polymer cellulose by hydrolysis or saponification in an aqueous alkali bath. During this hydrolysis the thin wall, small size fibers are especially sensitive to contact and fragile. Successful manufacture at minimum efficiency to be commercial depends upon maintaining sufficient tensile strength in the fibers throughout the wet processing steps to avoid breakage or damage. Thus, it would be highly desirable to improve the tensile strength characteristics of the fiber, particularly its wet strength during hydrolysis, or conversion from cellulose ester to cellulose, prior to drying and storage and assembly into hemodialyzers or hemofilters.

The concept of preparing semipermeable hollow fibers by melt spinning a placticized polymer composition was developed in the early 1960's and was first described in U.S. Pat. No. 3,423,491; various types of polymers are there described, including cellulose esters, and suitable plasticizers are discussed for use in forming the melt spin compositions with different types of thermoplastic polymers. The cellulose ester class of polymer developed into the favorite commercial polymer, particularly cellulose acetates, and tetramethylene sulfone, commonly called sulfolane, was normally employed as the plasticizer to make the melt spin composition for use in melt spinning cellulose acetate fibers. U.S. Pat. Nos. 3,494,780 and 3,532,527 disclosed improvements in the sulfolane - cellulose acetate melt spinning process of extruding cellulose acetate fibers involving either an after-spin immersing of the spun fiber in a bath containing a mixture of sulfolane and a polyol having a molecular weight below 4,000, or prior to spinning the fiber modifying the sulfolane plasticizer to include a minor amount of a polyol having a molecular weight below about 20,000. These patents also disclosed that polyols were considered to be unsatisfactory for use alone as the plasticizer to form melt spin compositions with cellulose esters, particularly the cellulose acetates.

This invention is based on the unexpected discovery that cellulose ester melt spin compositions which are sulfolane free and which include only certain low molecular weight polyols, or mixtures thereof can be melt spun into fibers that can be hydrolyzed into cellulose fibers which unexpectedly possess greatly improved wet strengths during the conversion from cellulose ester to cellulose. Omitting the sulfolane, previously considered to be necessary, is the key change which enables production of the greatly improved fibers of this invention. The resulting cellulose ester fibers of this invention possess satisfactorily high intrinsic tensile strengths in their as spun form and moreover the spun fibers retain, and in certain instances increase, their intrinsic tensile strengths during the polyol leaching and hydrolyzing, or deacetylation, steps which convert the cellulose ester fiber into a cellulose fiber.

SUMMARY DESCRIPTION OF THE INVENTION

This invention provides an improved cellulose semipermeable hollow fiber which is melt extruded from a cellulose ester melt spin composition which is sulfolane free and contains only low molecular weight polyols and the melt spun fibers possess substantially improved intrinsic tensile strength during wet processing steps which remove the polyol and hydrolyze the fibers to cellulose; the resulting cellulose fibers are characterized by substantially increased water permeability and improved clearance capabilities for separating low molecular weight impurities from blood such as urea, creatinine and the like. The improved cellulose hollow fiber of this invention is characterized by possessing an intrinsic wet tensile strength of about $2 \times 10^4$ to about $11 \times 10^4$ grams intrinsic fiber tensile strength per gram of cellulose polymer a water permeability or ultrafiltration coefficient $K_{UFR}$ in the range of about 2 to about 200 millimeters per hour per square meter per millimeter of mercury pressure across the semipermeable wall of the fiber, and a urea clearance coefficient $K_{UREA}$ in the range of about $15 \times 10^{-3}$ to about $45 \times 10^{-3}$ centimeters per minute at 37° C. These functional characteristics qualify such fibers for use in blood detoxification processes including hemodialysis and hemofiltration. This invention also provides an improved method for making the new fibers of this invention.

DETAILED DESCRIPTION OF THE INVENTION

The improved cellulose semipermeable hollow fibers of this invention are made by melt spinning a cellulose ester melt spin composition consisting of about 35% to about 80%, by weight, of a selected cellulose ester, or mixtures thereof, and a polyol, or mixtures thereof, having an average molecular weight in the range of about 106 to about 900.

The cellulose esters that are suitable include the cellulose mono-, di- and triacetates and mixtures thereof, cellulose acetate propionate, cellulose acetate butyrate, cellulose propionate and cellulose butyrate and mixtures of any two or more thereof. The acetates are preferred, particularly cellulose diacetate and mixtures advantageously include at least a minor proportion of one or more of the other cellulose acetates.

Polyols are not suitable as a class for mixture with the selected cellulose ester to make an acceptable melt spin composition, but rather the polyols that are satisfactory are limited to those low molecular weight polyols having an average molecular weight in the range of about 106 to about 900. Attempts to use a single polyol having a molecular weight above about 600 with cellulose acetate have failed because the composition could not be melt spun. However, satisfactory melt spin compositions have been prepared using mixtures of polyols in which one of the polyols in the mixture has an average molecular weight substantially higher than 900, for example, a molecular weight of 1450; a mixture of two polyethylene glycols one of molecular weight 200 and the other 1450 to produce an average molecular weight of 902 was successfully used to make a cellulose acetate melt spin composition that was spun into hollow fibers which exhibited the improved tensile stengths that characterize the fibers of this invention. Mixtures of polyethylene glycols with polyols for example a mixture of polypropylene glycol having an average molecular weight of 400 and glycerine produce a spinnable composition whereas polypropylene glycol, alone having an average molecular weight of 400 could not be successfully spun. Mixtures of polyethylene glycols and ethylene glycol are satisfactory and mixtures of two or more low molecular weight polyethylene glycols may be used with or without glycerine.

It has also been found that pure polyethylene glycols, or pure polypropylene glycols which have too high a molecular weight to form a spinnable cellulose ester composition can be modified by adding glycerine, a recognized nonsolvent for cellulose esters, to thereby form a composition that can be successfully spun into the improved fibers of this invention. The proportion of glycerine needed for this purpose varies with the molecular weight of the pure polyethylene or propylene glycol selected and also with the cellulose ester or mixture thereof that is present. In general, the quantity of glycerine that is needed increases as the average molecular weight of the pure glycol increases above about 600; glycerine concentration should also increase when the proportion of cellulose ester that is mixed with cellulose diacetate increases or for melt spin compositions made from cellulose propionate or cellulose butyrate or mixtures thereof. As a general guide, amounts of glycerine in the range of about 5% to about 35%, by weight, of the cellulose ester melt spin composition may be satisfactorily employed. Polyols having at least two hydroxyl groups in the molecule that are satisfactory for use include diethylene glycol, triethylene glycol, tetraethylene glycol, the mono-, di- and tri-propylene glycols and mixtures of one or more of the propylene and ethylene glycols or glycols having ethylene-propylene chains in the glycol molecule, and mixtures of any one or more polyethylene, or polypropylene glycol with glycerine in an amount less than 50%, by volume, of the glycol-glycerine mixture.

The process of this invention comprises the steps of mixing the selected cellulose ester and selected polyol to form a melt spin composition, melt spinning hollow fibers and cooling same to a gelled self-supporting state, hydrolyzing, or deacetylating, the cellulose ester hollow fiber to substantially a cellulose fiber, that is, hydrolyzing a substantial portion of the ester groups back to the cellulose hydroxyl group. Complete hydrolysis is usually not obtained and is not necessary but it is desirable for best overall permeability characteristics and the maintenance thereof during storage and shipment, to bring about or achieve substantially complete hydrolysis, for example, above about 90%. The polyol which is present in the as-spun cellulose ester fiber is normally leached from the fiber during hydrolysis or deacetylation; alternatively the polyol may be removed in a separate step preceding the hydrolysis.

Cellulose semipermeable hollow fibers made from a sulfolane-acetate melt spin composition by the process of U.S. Pat. No. 3,546,209 on a commercial basis and as used in artificial kidneys extensively after about 1972 have typically possessed a water permeability ceofficient $K_{UFR}$ of about 1.0–1.2 milliliters per hour per square meter of fiber surface area per millimeter of mercury pressure across the fiber semipermeable wall at 37° C., a urea coefficient $K_{UREA}$ of about 28 to about $30 \times 10^{-3}$ centimeters per minute and a wet cellulose fiber strength after deacetylation of about 1.4 to about 1.8 grams intrinsic fiber tensile strength per gram of cellulose polymer. The improved cellulose fibers of this invention are substantially improved in each of these three important functional characteristics; the most unexpected and significantly improved property is the increased intrinsic wet tensile strength. As above indicated the wet tensile strength of the fibers is critically important to successful continuous production in a production train or line. Typically such a line employs a tow of 16 to 30 fibers, or a plurality of such tows, which passes from the spinnerettes through air to gel to a self-supporting fiber and thence through a series of liquids in treatment tanks that sequentially leach the polyol from the cellulose ester fiber, hydrolyze the ester to cellulose, rinse the hydrolysis products and excess hydrolyzing agent from the cellulose fiber and replasticize the cellulose fiber. The replasticized product fibers are then taken up on receiving rolls. During the wet treatment steps the fibers are continually subjected to a pulling, or longitudinally applied, force while undergoing drastic internal molecular rearrangements, particularly those resulting from polyol removal and chemical changes during deacetylation from a cellulose ester to substantially a cellulose fiber. Fiber breakage, or damage, due to the inability of the polymer skeleton in each fiber to withstand tensional or frictional forces during such continous processing is disruptive to continuous operation and is highly undesirable.

It has been observed that cellulose acetate fibers made from a melt spin composition of this invention, which is free of sulfolane, tend to retain a higher proportion of their as-spun tensile strength during travel through the successive wet processing steps than those made from the sulfolane-containing melt spin compositions that have long been in commercial use. Moreover, certain of the improved fibers experience an unexpected increased in tensile strength from their as-spun state and this increase occurs during the hydrolyzing steps of the process. The cellulose fibers of this invention exhibit average intrinsic tensile strengths, in the wet state after hydrolysis, that are at least twice and up to about seven times higher than those of cellulose hollow fibers made by the process of U.S. Pat. No. 3,546,209. As used in this specification, and in the claims, the expression "intrinsic fiber tensile strength" as applied to wet cellulose fiber tensile strength measurements refers to the ultimate, or breaking, strength in grams per gram of polymer in a two inch length of a single wet fiber required to break that fiber when it is vertically suspended between gripping jaws in an Instron machine. In the tests made to obtain the wet intrinsic tensile strengths referred to in Table I, the grams of polymer in a selected two inch length of fiber represent an average weight in grams which was determined for each particular two-inch sample of cellulose fiber by drying the adjacent one thousand inches of fiber from the same strand to a constant weight and then weighing the 1000 inch long strand and dividing the total weight by 500 to thereby obtain an average weight which is then used for the particular 2" portion subjected to the breaking strength test. This procedure effectively increases the accuracy of the thus determined tensile strength by substantially eliminating the potential error due to fiber wall thickness variation along the continuous fiber. Additionally, each tensile strength value represents the average of six determinations on separate two-inch long specimens. The thus determined increases in intrinsic tensile strength that are achieved are commercially significant in that they greatly increase overall manufacturing efficiency in the continuous manufacture of the fibers of this invention.

Whereas the above described effects of increased wet tensile strength during fiber manufacture has high commercial value, the increase in water permeability capability attained in certain of the fibers made by the process of this invention is also highly important; certain fibers have reached up to 80 times increase in water permeability relative to heretofore available cellulose fibers made from cellulose acetate melt spin compositions. Such increases in water permeability means that the fiber capability of separating water from a water containing fluid, such as blood, is drastically increased and the practical advantage which results is significant in that it enables substantial reductions in the required time per hemodialysis treatment, as is well understood by those skilled in this art.

Formulating the melt spin composition may be accomplished in any convenient manner with conventional mixing equipment, the important feature being to insure sufficient mixing to obtain an intimate uniform mixture. For example, dry cellulose acetate powder is blended with a weighed amount of selected polyol in a shearing Hobart mixer; the mixed material is further homogenized and blended by feeding the same into a heated counter-rotating twin screw extruder and the molten extrudate then forced through a spinnerette, for example, a 16-30 hole spinnerette of the type including conventional gas supply means for injecting gas into the core of the extrudate. A preferred gas for this purpose is nitrogen but other gases may be satisfactorily employed, including carbon dioxide, air, or other innocuous gases. If desired, a spinnerette equipped with means for injecting a liquid into the extrudate core which is a non-solvent for the cellulose ester and the polyol may be used, for example by using a spinnerette of the type disclosed in U.S. Pat. No. 3,888,771. The extrudate exiting from the spinnerette is subjected to cooling, such as forced air cooling of varying force and/or temperature, to cause gellation and solidification of the extrudate into solid, self-supporting fibers.

The cellulose ester fiber may be hydrolyzed satisfactorily by any of the now well known deacetylation techniques. The preferred procedure is to use an aqueous sodium hydroxide bath. Suitable techniques are described in a variety of books and technical papers including, for example, Laidler, Chemical Kinetics, McGraw Hill Book Co., New York (1950), pp. 282-290; Howlett, et al., Technical Inst. J. 38, 212 (1947); Hiller, Jour. Polymer Science 10, 385 (1953) etc. After rinsing to remove the products of hydrolysis and excess hydrolyzing agent, or neutralizing same, the fibers while still wet are replasticized with a water soluble, essentially non-volatile plasticizer in accordance with the teachings of Lipps U.S. Pat. No. 3,546,209. By the expression "essentially non-volatile" as used in this specification and in the claims is meant that the plasticizer is essentially retained by the cellulose fiber during the subsequent drying step and ambient temperature storage.

Suitable plasticizers for the deacetylated cellulose fibers include those which are capable of swelling the fiber presumably by such interactions as hydrogen bonding or dipole-dipole reactions. Preferably the water soluble, essentially non-volatile plasticizer is a hydroxyl containing compound and more preferably a polyol such as polyalkylene oxides; glycols such as ethylene glycol, diethylene glycol, dipropylene glycol, tripropylene glycol and the like; glycerine and the like. Glycerine is a plasticizer of choice.

Following plasticization the fiber is then dried by any convenient method such as vacuum drying, forced air drying at ambient or elevated temperatures, microwave drying and the like. Elevated temperatures may be used so long as the temperature does not cause any substantial loss of plasticizer. Consequently, an elevated drying temperature is dependent on the particular plasticizer used and a suitable temperature is readily determined.

The dried final product cellulose fibers of this invention are of capillary size and are in the range of about 200 to about 400 microns outside diameter and have a wall thickness in the range of about 10 to about 80 microns. For separatory cells used in hemodialysis the fibers preferably have a wall thickness in the range of about 10 to 50 microns and a maximum outside diameter of about 230–320 microns.

The following examples illustrate the new process and the improved cellulose hollow fibers of this invention and contain the best mode contemplated to be employed. As used in this specification and claims, unless otherwise specifically indicated, all compositional percentages are by weight. Each of the specifically formulated melt spin compositions was made by using the above identified mixing equipment and steps described and the fibers were spun from a 16 opening spinnerette using nitrogen injected into the fiber core. After gelling in air and samples were removed for determination of the as-spun grams intrinsic fiber tensile strength described procedure, the fibers were deacetylated in a caustic solution, typically aqueous sodium hydroxide in the range of 0.2–1.2%, by weight, at a temperature in the range of 20° C.–60° C.

As spun intrinsic tensile strengths were established by weighing 600 inches of the adjacent fiber to establish the average weight for the selected 2" portion of each single fiber subjected to the breaking test.

The resulting cellulose fibers were thereafter washed thoroughly in water and samples taken for determination of wet tensile fiber strength by the test procedure above described. The product fibers were also tested for water permeability $K_{UFR}$, and urea clearance, or transport, $K_{UREA}$ in a laboratory test apparatus. The test apparatus consisted of a fluid reservoir equipped with a magnetic stirrer, and a dialyzer test beaker fitted with a magnetic stirrer, a top closure plate having pressure fittings and connectors for receiving the ends of the potting sleeves attached to each end of a bundle of fibers containing between 128 and 178 fibers per bundle. The fiber bundle was bent into a U-shape and inserted into the beaker and connected to the closure plate; one sleeve was connected by a fluid line to a pump connected with a line to the reservoir and the other sleeve was connected by a return line to the reservoir to thereby enable fluid from the reservoir to be pumped under controllable pressure through the lumens of the fibers located in the dialysis beaker. The beaker was also provided with dialysate inlet and outlet connections and during testing the fibers were immersed in a surrounding stirred pool of water for the $K_{UFR}$ test.

The water transport coefficient, $K_{UFR}$, was determined by pumping water under pressure through the fibers and measuring the increase in water volume external to the fibers in the dialyzer beaker, the tests being run at 37° C. $K_{UFR}$ was then calculated for each test in milliliters per square meter per hour per millimeter of mercury pressure differential as shown in Table I.

The urea coefficient, $K_{urea}$, was determined by providing a water-urea solution in the supply reservoir and pumping same through the fiber lumens, the pool surrounding the fibers in the dialysis beaker being initially pure water. Measurements were made to determine the urea concentration in the dialysate fluid at time intervals.

The tests were conducted at 37° C. and there was no pressure differential across the fiber wall surface during the tests.

The urea coefficient, $K_{urea}$, was calculated by taking into account the difference in the concentrations of urea in the supply reservoir and in the dialysis beaker on the outside of the fibers as a function of time and the fiber area in accordance with the equation:

$N = K_{UREA} A (C_1-C_2)$ wherein N represents the flux across the membrane in moles per minute, $C_1$ is the initial urea concentration, $C_2$ is the final, or measured, concentration and A is the area of the fiber wall or membrane between the two solutions.

In a two-chamber system without a pressure differential or resultant ultrafiltration the transfer of urea across the membrane wall may be integrated over a time interval, t, to yield the further equation:

$$\ln\left[\frac{(C_1-C_2)^{t=o}}{(C_1-C_2)^t}\right] = \left[\frac{V_1+V_2}{V_1 V_2} \cdot A\right] K_{UREA} \cdot t$$

wherein $V_1$ is the volume of supply reservoir solution, and $V_2$ is the volume of the solution in the dialysis beaker.

In the tests, the volumes, $V_1$ and $V_2$ and the area A are measured separately so that a plot of the values on each side of the integrated equation produced a straight line, the slope of which allows $K_{urea}$ in units of centimeter per minute to be calculated.

EXAMPLE 1

An intimate blend of cellulose diacetate polymer and plasticizer was prepared as previously described. The blend consisted of a mixture of 80% cellulose diacetate and a 20% of a mixture of polyethylene glycols of molecular weights 200 and 1450 Daltons to produce an average molecular weight of the mixed polyethylene glycol plasticizer of 902 Daltons. The cellulose diacetate hollow fibers were subsequently deacetylated to cellulose hollow fiber membranes in a 0.8% sodium hydroxide aqueous solution at 50° C. The hollow fiber membrane intrinsic tensile strengths, water permeabilities ($K_{UFR}$), and urea transport rates (Kurea) are summarized in Table I, Column B.

As may be seen from Table I, the wet cellulose fiber of this example has over 2.5 times the wet intrinsic tensile strength of the reference fiber. The product cellulose fiber produced from this relatively high molecular weight polyol melt spin composition also exhibits its superior performance characteristics for blood purificiation and higher water permeability. The water permeability ($K_{UFR}$) is 1.5 times that of the reference fiber. The rate of urea transfer is also higher: Kurea = $38 \times 10^{-3}$ cm as compared to $30 \times 10^{-3}$ cm/min of the reference cellulose fiber membrane.

A similar blend was made by mixing cellulose diacetate and the same mixture of polyethylene glycols having an average molecular weight of 902 except 43% of cellulose diacetate was used instead of 80%. After melt spinning, the cellulose acetate hollow fibers were hydrolyzed, or saponified, in a 0.4% NaOH aqueous solution at 50° C. After testing, as above, the intrinsic wet tensile strength was 1.3 times the reference fiber. Kurea was 26 as compared to 30 for the reference fiber but $K_{UFR}$ was increased drastically to 86 times the $K_{UFR}$ of the reference fiber, or a value of 104 millimeters per hour per square meter per millimeter of mercury. From a comparison of these two melt spin compositions it will be seen that for a given polyol plasticizer the decrease in cellulose ester concentration causes a substantial increase in water permeability at acceptable urea clearance values. It should also be noted that a weaker hydrolyzing solution was employed and that stronger saponifying solutions usually increase water permeability. Thus, the desired combination of intrinsic wet strength, $K_{UFR}$ and Kurea properties can be modified to those specifically desired by similar nelt spin composition changes, or by modifying the average molecular weight of the polyol as may be seen from comparisons that may be made with the examples which follow.

EXAMPLE 2

An intimate blend of cellulose diacetate polymer and plasticizer was prepared using the above described procedures. The blend consisted of 43% of a mixture of cellulose diacetate and 57% of polyethylene glycol having an average molecular weight of 400 Daltons. The cellulose diacetate hollow fibers after being deacetylated to cellulose hollow fiber membranes in an aqueous 0.4% NaOH solution at 50° C. were tested for intrinsic tensile strengths, water permeability ($K_{UFR}$), and urea transport (Kurea) and the results are summarized in Table I, Column C.

The wet intrinsic tensile strength of the product fiber is 2.4 times the intrinsic strength of the reference fiber, $K_{UFR}$ is 2.1 times higher and Kurea is $32 \times 10^{-3}$ relative to to $30 \times 10^{-3}$ or the reference fiber. It should be noted that during saponification from cellulose acetate to cellulose the wet intrinsic tensile strength increased to a value nearly double that of its as spun intrinsic tensile strength.

Another blend having the same proportions of cellulose diacetate and polyethylene glycol was prepared except the glycol average molecular weight of 400 Daltons was attained by mixing polyethylene glycol of average molecular weight of 600 with glycerine having an average molecular weight of 92 Daltons. This change caused an improvement in all of the fiber properties to a wet cellulose fiber intrinsic tensile strength of 3.7 times the reference, a $K_{UFR}$ of 3.4 times the reference and a Kurea of $33 \times 10^{-3}$ compared to $30 \times 10^{-3}$ cm for the reference.

EXAMPLE 3

An intimate mixture of cellulose diacetate polymer and plasticizer was prepared as previously described. The blend consisted of a 43% mixture of cellulose diacetate and 57% of polyethylene glycol of molecular weight 108 Daltons. The cellulose diacetate hollow fibers were subsequently deacetylated to cellulose hollow fiber membranes in an 0.8% NaOH solution at 50° C. The hollow fiber membrane intrinsic tensile strengths, water permeabilities and urea transport rates are summarized in Table I, Column D.

As can be seen from Table I, the wet cellulose fiber of this example has 1.9 times the intrinsic tensile strength of the reference fiber. The water permeability $K_{UFR}$ is 1.8 times that of the reference fiber and Kurea is $32 \times 10^{-3}$ cm/min as compared to $30 \times 10^{-3}$ cm/min for the reference cellulose membrane.

A similar blend was made in the same manner except that the polyethylene glycol had a molecular weight of 150. Saponification of the cellulose acetate to cellulose was done in a 0.4% NaOH aqueous solution at 50° C. The same fiber properties were measured, as above described, and the wet intrinsic tensile strength was 6.6 times the ference fiber while $K_{UFR}$ and Kurea were substantially the same as the reference fiber. By comparing the wet intrinsic tensile strengths of the cellulose fibers of Example 2 with those of Example 3 it will be seen that best wet intrinsic tensile strength, for a given cellulose ester concentration, 43% cellulose diacetate, is obtained at a polyglycol average molecular weight between 106 and 400 and appears to peak at about 150.

EXAMPLE 4

An intimate mixture of cellulose diacetate polymer and plasticizer was prepared as previously described. The blend consisted of 43% (by weight) of a mixture of cellulose diacetate and 57% (by weight) of a mixture of polyethylene gycols of molecular weights 400 and 1450 Daltons. The average molecular weight of the polyethylene glycol plasticizer was 713 Daltons. The cellulose diacetate hollow fibers were subsequently deacetylated to cellulose hollow fiber membranes by the procedure previously described. The fiber properties are summarized in Table I, Column E.

From Table I it will be seen that wet intrinsic tensile strength increased to a value more than twice that of the as spun intrinsic tensile strength and to a wet cellulose intrinsic tensile strength 3.2 times that of the reference fiber, with a Kurea of $34 \times 10^{-3}$ versus $30 \times 10^{-3}$ cm/min for the reference fiber, and a $K_{UFR}$ of 2.4 times that of the reference fiber.

EXAMPLE 5

An intimate mixture of cellulose diacetate polymer and plasticizer was prepared as previously described. The blend consisted of 43% of a mixture of cellulose diacetate and 57% of a mixture of polyethylene glycol of molecular weight 400 Daltons and glycerine of molecular weight 92 Daltons to give a polyol blend having an average molecular weight of 362 Daltons. The cellulose diacetate hollow fibers were subsequently deacetylated to cellulose hollow fiber membranes in a 0.4% NaOH aqueous solution at 50° C. The cellulose hollow fiber membrane intrinsic tensile strengths, $K_{UFR}$ and Kurea, and summarized in Table I, Column F.

From Table I it will be seen that wet intrinsic tensile strength increased 242% during saponification to give a cellulose fiber wet intrinsic tensile strength 5.8 times that of the reference fiber. The urea clearance rate was substantially improved to $42 \times 10^{-3}$ cm/min or 1.3 times that of the reference fiber while $K_{UFR}$ was 2.1 times as high as that of the reference fiber.

Another melt spin composition was made identical to the above described polyethylene glycol-glycerine blend and cellulose diacetate except that the glycerine was replaced with a like quantity, 7% by volume, of the ethylene glycol to thereby form a polyol blend having an average molecular weight of 358. Fibers were spun and deacetylated under the same conditions; comparable properties of the resultant cellulose fiber were determined in the same manner; the cellulose fibers had a wet intrinsic tensile strength that was 5.8 times that of the reference fiber, a Kurea of $21 \times 10^{-3}$ cm/min and a $K_{UFR}$ that was 1.7 times that of the reference fiber.

EXAMPLE 6

A melt spin composition was formed by uniformly blending 36% cellulose diacetate and 64% of a polyol blend consisting of a mixture of polyethylene glycol having an average molecular weight of 600 Daltons and glycerine in amounts to produce an average molecular weight of 421 for the blend. Fibers were melt spun and deacetylated in a 0.4% NaOH aqueous solution at 50° C. and the properties were determined by the above described procedures and they appear in Table I, Column 9. These cellulose fibers have a combination of high wet tensile strength, high $K_{UFR}$ and high Kurea and represent a preferred form of the invention in that such fibers are satisfactory for use in hemodialysis or hemofilters and are particularly desireable for hemofilter use. The wet intrinsic tensile strength is 3.4 times that of the reference fiber, the $K_{UFR}$ is 32 times higher than the reference fiber and Kurea is $49 \times 10^{-3}$ cm/min.

EXAMPLE 7

An intimate mixture (blend) of cellulose di-ester (propionate/acetate) and plasticizer was prepared as previously described. The cellulose ester of this example may be generally considered to be cellulose propionate, as 96% of the ester groups are propionate, and only 4% are acetate.

The blend consisted of 43% of a mixture of cellulose propionate and 57% of a mixture of polyethylene glycol of average molecular weight 400 Daltons and glycerine of molecular weight 92 Daltons for form a polyol blend having an average molecular weight of 362 Daltons. The cellulose propionate hollow fibers were subsequently deacetylated to cellulose hollow fiber membranes in a 0.4% NaOH aqueous solution at 50° C. The hollow fiber membrane intrinsic tensile strengths, water permeabilities and urea transport rates are summarized in Table I, Column H.

As can be seen from Table I, the wet cellulose fiber of this example has 3.5 times the intrinsic tensile strength of the reference fiber. The water permeability $K_{UFR}$ is 2.4 times that of reference fiber, and the rate of urea transfer, Kurea is $33 \times 10^{-3}$ cm/min.

EXAMPLE 8

A melt spin composition was formed by intimately blending 43% cellulose diacetate and 57% of a polyol blend consisting of a mixture of polypropylene glycol having an average molecular weight of 400 Daltons with glycerine to form an average molecular weight for the polypropylene glycol/glycerine blend of 297. Cellulose fibers were made and tested by the procedures described above with deacetylation being effected in a 0.4% NaOH solution at 50° C. The properties appear in Table I, Column I.

EXAMPLE 9

Artificial kidneys of the type commercially available from Cordis Dow Corp. under the trademark C-DAK artificial kidneys were manufactured using cellulose fibers made in commercial quantities by the process described in Example 5, above, using the melt spin composition consisting of 43% cellulose diacetate and 57% of a mixture of polyethylene glycol having a molecular weight of 400 Daltons and glycerine to give a polyol blend having an average molecular weight of 362 Daltons. The wet intrinsic tensile strength was determined to be $11 \times 10^4$ grams per gram cellulose fiber.

After the cellulose fibers were water rinsed and replasticized in an approximately 10% glycerine-water solution and then dried the fibers contained approximately 20% glycerine. The intrinsic tensile strength of these fibers was determined by the single fiber breaking test on the Instron machine described above in connection with the tests on dry cellulose acetate fibers with the following variations. A tow consisting of 360 fibers one meter long was weighed, the glycerine was extracted and the pure cellulose fiber was weighed. The average weight of a two-inch long section was then calculated on a 100% polymer fiber basis. The tensile test results represent the average of six separate tests on six two-inch long fibers from the glycerine-free tow. The dry intrinsic tensile weight was $20 \times 10^4$ grams per gram of cellulose fiber.

One of the artificial kidneys containing 1.5 square meters of cellulose fiber area was sterilized, dry, by the application of 2.5 MRAD of gamma rays. After sterilization the kidney was opened and fiber samples removed and subjected to the wet intrinsic tensile test, and the fibers were found to have an average wet intrinsic tensile strength of $8.6 \times 10^4$ grams per gram of cellulose fiber. Another 1.5 square meter kidney manufactured to contain the cellulose fibers of this example was sterilized while the kidney was filled with physiological saline solution by the application of 2.5 MRAD of gamma rays. Fibers from this wet gamma ray sterilized kidney had a wet intrinsic tensile strength of $5.2 \times 10^4$ grams per gram of cellulose fiber.

In comparison artificial kidneys from commercial production at Cordis Dow Corp. containing 1.5 square meters of cellulose fibers made by the process of U.S. Pat. No. 3,546,209 were tested in the same manner as were the above described fibers and were found to have the following properties:

Dry intrinsic cellulose fiber tensile strength—$7.5 \times 10^4$ grams/gram

Wet intrinsic cellulose fiber tensile strength—$1.6 \times 10^4$ grams/gram

Wet cellulose fiber after dry gamma ray sterilization—intrinsic tensile strength $1.53 \times 10^4$ grams/gram Wet cellulose fiber after wet (physiological saline) gamma ray sterilization—intrinsic tensile strength—$1.28 \times 10^4$ grams/gram Clinical evaluations of two 1.5 square meter artificial kidneys containing the improved cellulose fibers of this example were run on two intermittent hemodialysis patients at an average blood flow rate of 200 ml/min and a dialysate flow rate of 500 ml/min for times of 3.5 hours and 4.1 hours. The $K_{UFR}$ was $$2.1 \frac{\text{ml}}{\text{hr} \cdot M^2 \cdot \text{mmHg}}$$

at 37° C. The Kurea was 31.6 cm/min at 37° C.

For comparison, commercial Cordis Dow artificial kidneys containing 1.5 square meters of cellulose fibers made by the process of U.S. Pat. No. 3,546,209 used on three intermittent hemodialysis patients gave average values for $K_{UFR}$ of $$0.89 \frac{\text{ml}}{\text{hr} \cdot M^2 \cdot \text{mmHg}}$$

at 37° C. and a Kurea of 29.6 cm/min at 37° C.

The artificial kidneys used in this example and above referred to as the type commercially available from Cordis Dow Corp. are devices having a pair of blood chambers spaced apart by an intervening dialysate chamber that is integrally connected to the blood chambers. A bundle of hollow fibers consisting normally of multithousands of individual fibers, for example six thousand to fifteen thousand fibers, terminate at their opposite ends in a plastic tubesheet, typically a polyurethane. The tubesheet binds the fibers to each other and also provides an annular portion lying outside the periphery of the fibers in the bundle which serves to join the tubesheets to the end portions of the dialysate chamber and to the blood chambers to thereby seal the blood chambers and the dialysate chambers into a unit, with the fibers located within the dialysate chambers, such that the chambers are isolated from each other in fluid-tight sealing relationship. The open ends of the hollow fibers terminate in the plane of the outer end of each tubesheet and the passageways in the hollow fibers provide communications between the interiors of the spaced apart blood chambers.

| FIBER CHARACTERISTICS | | (A) REFERENCE Commercial Cellulose Hollow Fiber of U.S. Pat. No. 3,546,209 | (B) Example #1 | (C) Example #2 | (D) Example #3 | (E) Example #4 | (F) Example #5 | (G) Example #6 | (H) Example #7 | (I) Example #8 |
|---|---|---|---|---|---|---|---|---|---|---|
| (A) | Dry Cellulose Acetate fiber strength before Deaceylation: grams intrinsic fiber tensile strength per gram of cellulose acetate polymer in a two-inch length of a single fiber | $7.2 \times 10^4$ | $7.4 \times 10^4$ | $2.0 \times 10^4$ | $4.4 \times 10^4$ | $2.3 \times 10^4$ | $3.8 \times 10^4$ | $3.7 \times 10^4$ | $5.7 \times 10^4$ | $5.9 \times 10^4$ |

-continued

| FIBER CHARACTERISTICS | (A) REFERENCE Commercial Cellulose Hollow Fiber of U.S. Pat. No. 3,546,209 | (B) Example #1 | (C) Example #2 | (D) Example #3 | (E) Example #4 | (F) Example #5 | (G) Example #6 | (H) Example #7 | (I) Example #8 |
|---|---|---|---|---|---|---|---|---|---|
| (B) Wet cellulose fiber strength after Deacetylation: grams intrinsic fiber tensile strength per gram of cellulose polymer in a two-inch sample of a single fiber | $1.6 \times 10^4$ | $4.2 \times 10^4$ | $3.9 \times 10^4$ | $3.1 \times 10^4$ | $5.1 \times 10^4$ | $9.2 \times 10^4$ | $5.5 \times 10^4$ | $5.6 \times 10^4$ | $3.6 \times 10^4$ |
| (C) Fiber tensile strength change during conversion from as spun cellulose acetate to final cellulose semipermeable wet fiber | About −78% | −43% | +195% | −20% | +222% | +242% | +149% | −2% | −39% |
| (D) Water Permeability of final wet cellulose hollow fiber membrane $K_{UFR} = \frac{\text{cubic centimeters}}{\text{hour} \cdot \text{square meter} \cdot \text{millimeter mercury}}$ at 37° C. | 1.0–1.2 | 1.8 | 2.5 | 2.1 | 2.9 | 2.5 | 38.0 | 2.9 | 3.5 |
| (E) Urea clearance rate of final wet cellulose hollow fiber membrane $K_{urea} = \frac{\text{centimeters}}{\text{minute}}$ at 37° C. | $28\text{–}30 \times 10^{-3}$ | $38 \times 10^{-3}$ | $32 \times 10^{-3}$ | $32 \times 10^{-3}$ | $34 \times 10^{-3}$ | $42 \times 10^{-3}$ | $49 \times 10^{-3}$ | $33 \times 10^{-3}$ | $44 \times 10^{-3}$ |

What is claimed is:

1. A process for making a semipermeable cellulose hollow fiber having an ultrafiltration coefficient $K_{UFR}$ in the range of about 2 to about 200 milliliters per hour per square meter per millimeter of mercury, a urea coefficient Kurea in the range of about $15 \times 10^{-3}$ to about $45 \times 10^{-3}$ centimeters per minute, and a wet intrinsic tensile strength in the range of about $2 \times 10^4$ to about $11 \times 10^4$ force per gram of cellulose polymer which comprises:

(a) melt spinning a hollow fiber cellulose ester fiber through a nozzle from a melt spin composition consisting essentially of about 36 to less than 50 weight percent cellulose ester and the balance at least one polyol having an average molecular weight between about 106 and about 900;

(b) hydrolyzing said cellulose ester fiber with an aqueous alkali solution free of glycerol, substantially into a cellulose hollow fiber;

(c) replasticizing said cellulose fiber while said fiber is still wet with a water soluble, essentially non-volatile plasticizer; and (d) drying said plasticizer fiber.

2. A process in accordance with claim 1 wherein said melt spin composition contains about 36 to about 43 percent cellulose ester.

3. A process in accordance with claim 1 wherein said ester consists essentially of cellulose diacetate.

4. A process in accordance with claim 1 wherein said cellulose ester includes cellulose acetate propionate.

5. A process in accordance with claim 1 wherein polyol is at least one polyol selected from the group consisting of polyethylene glycols, polypropylene glycols and glycerine.

6. A process in accordance with claim 1 wherein said melt/spin composition consists essentially of a blend, by weight, of 43% cellulose diacetate and 57% of polyethylene glycol having an average molecular weight of 400 Daltons.

7. A process in accordance with claim 1 wherein said malt/spin composition consists essentially of a mixture, by weight, of 43% cellulose diacetate and 57%, by weight, of a mixture of polyethylene glycols of molecular weights 400 and 1450 Daltons and having an average molecular weight of 713 Daltons.

8. A process in accordance with claim 1 wherein said melt/spin composition consists essentially of a blend, by weight, of 43% cellulose diacetate and 57% of a mixture of polyethylene glycol of molecular weight 400 Daltons and glycerine of molecular weight 92 Daltons to give a polyol blend having an average molecular weight of 362 Daltons.

9. A process in accordance with claim 1 wherein said melt/spin composition consists essentially of a blend, by weight, of 36% cellulose diacetate and 64% of a polyol blend of polyethylene glycol having an average molecular weight of 600 Daltons and glycerine in an amount to produce an average molecular weight of 421 Daltons.

* * * * *